(12) United States Patent
Nakagawa et al.

(10) Patent No.: US 11,229,873 B2
(45) Date of Patent: Jan. 25, 2022

(54) CO2 RECOVERY DEVICE AND CO2 RECOVERY METHOD

(71) Applicant: Mitsubishi Heavy Industries Engineering, Ltd., Kanagawa (JP)

(72) Inventors: Yosuke Nakagawa, Tokyo (JP); Daisuke Shimada, Tokyo (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 100 days.

(21) Appl. No.: 16/771,118

(22) PCT Filed: Dec. 26, 2018

(86) PCT No.: PCT/JP2018/047811
§ 371 (c)(1),
(2) Date: Jun. 9, 2020

(87) PCT Pub. No.: WO2019/131747
PCT Pub. Date: Jul. 4, 2019

(65) Prior Publication Data
US 2020/0368672 A1    Nov. 26, 2020

(30) Foreign Application Priority Data
Dec. 27, 2017    (JP) .............................. JP2017-251925

(51) Int. Cl.
*C01B 32/50*    (2017.01)
*B01D 53/14*    (2006.01)
(Continued)

(52) U.S. Cl.
CPC ..... *B01D 53/1412* (2013.01); *B01D 53/1425* (2013.01); *B01D 53/1475* (2013.01);
(Continued)

(58) Field of Classification Search
CPC .... B01D 53/1475; B01D 53/62; B01D 53/78; B01D 53/96; B01D 2257/504;
(Continued)

(56) References Cited

U.S. PATENT DOCUMENTS

| 9,429,318 B2* | 8/2016 | Rost | B01D 53/1475 |
| 2010/0095851 A1* | 4/2010 | Hu | B01D 53/1418 |
| | | | 96/236 |

(Continued)

FOREIGN PATENT DOCUMENTS

| JP | 2010201379 A | 9/2010 |
| JP | 2011042554 A | 3/2011 |

(Continued)

OTHER PUBLICATIONS

International Search Report in corresponding International Application No. PCT/JP2018/047811, dated Feb. 26, 2019 (4 pages).

(Continued)

*Primary Examiner* — Timothy C Vanoy
(74) *Attorney, Agent, or Firm* — Osha Bergman Watanabe & Burton LLP

(57) ABSTRACT

A $CO_2$ recovery device includes: an absorption tower configured to bring an emission gas including $CO_2$ in contact with an absorbent solution, to remove the $CO_2$ from the emission gas, and to thereby generate a rich solution corresponding to the absorbent solution having absorbed the $CO_2$; a regeneration tower configured to regenerate the absorbent solution by removing the $CO_2$ from the rich solution; a heat exchanger configured to carry out heat exchange between the rich solution and the absorbent solution which is higher in temperature than the rich solution and from which the $CO_2$ is removed; an absorbent-solution delivery pipe configured to deliver the absorbent solution subjected to the heat exchange in the heat exchanger to the absorption tower; and (Continued)

a bypass pipe configured to deliver the rich solution before the heat exchange to the absorbent-solution delivery pipe.

6 Claims, 6 Drawing Sheets

(51) Int. Cl.
*B01D 53/18* (2006.01)
*B01D 53/62* (2006.01)
*B01D 53/78* (2006.01)
*B01D 53/96* (2006.01)
*B01D 53/34* (2006.01)

(52) U.S. Cl.
CPC ........... *B01D 53/18* (2013.01); *B01D 53/346* (2013.01); *B01D 53/62* (2013.01); *B01D 53/78* (2013.01); *B01D 53/96* (2013.01); *C01B 32/50* (2017.08); *B01D 2252/204* (2013.01)

(58) Field of Classification Search
CPC ... B01D 2258/0283; B01J 4/008; B01J 10/00; B01J 19/24; B01J 2219/00; B01J 2219/00164; B01J 2219/00182; B01J 2219/24; Y02C 20/40; Y02E 20/32
See application file for complete search history.

(56) References Cited

U.S. PATENT DOCUMENTS

| 2010/0319532 | A1  | 12/2010 | Iijima et al. | |
|---|---|---|---|---|
| 2011/0041685 | A1  | 2/2011  | Tanaka et al. | |
| 2012/0067219 | A1  | 3/2012  | Ogawa et al. | |
| 2013/0019751 | A1  | 1/2013  | Rost et al. | |
| 2013/0343976 | A1* | 12/2013 | Udatsu | B01D 53/62 |
| | | | | 423/220 |
| 2015/0132195 | A1* | 5/2015  | Bae | B01D 53/18 |
| | | | | 422/187 |
| 2020/0289974 | A1* | 9/2020  | Raynel | C10L 3/102 |

FOREIGN PATENT DOCUMENTS

| JP | 2013022514 A | 2/2013 |
|---|---|---|
| JP | 2013523429 A | 6/2013 |
| JP | 5383338 B2 | 1/2014 |
| JP | 2014024056 A | 2/2014 |
| JP | 5749677 B2 | 7/2015 |
| WO | 2009104744 A1 | 8/2009 |

OTHER PUBLICATIONS

Written Opinion in corresponding International Application No. PCT/JP2018/047811, dated Feb. 26, 2019 (20 pages).

* cited by examiner

CO2 RECOVERY DEVICE AND CO2 RECOVERY METHOD

TECHNICAL FIELD

The present invention relates to a $CO_2$ recovery device and a $CO_2$ recovery method.

The present application claims the benefit of priority on Japanese Patent Application No. 2017-251925 filed on Dec. 27, 2017, the subject matter of which is hereby incorporated herein by reference.

BACKGROUND ART $CO_2$ devices configured to control $CO_2$ emission by removing $CO_2$ (carbon dioxide) from emission gas have been used in plants. In a $CO_2$ recovery device, emission gas is brought into contact with an amine-based absorbent solution (hereinafter, referred to as an absorbent solution) in an absorption tower to produce a rich solution of an absorbent solution having absorbed $CO_2$. Subsequently, the $CO_2$ recovery device sends out a rich solution to a regeneration tower to isolate $CO_2$ included in a rich salutation, to regenerate an absorbent solution, and to thereby circulate the absorbent solution to the absorption tower again. The $CO_2$ recovery device may press the isolated $CO_2$ gas into an oil field or may reserve the $CO_2$ gas in an aquifer, thus preventing $CO_2$ from being emitted into the atmosphere. In this connection, Patent Document 1 discloses a related art.

CITATION LIST

Patent Literature Document

Patent Document 1: Japanese Patent No. 5749677

SUMMARY OF INVENTION

Technical Problem

In the above $CO_2$ recovery device, it is required to efficiently circulate an absorbent solution or a rich solution by reducing a failure rate of the device.

The present invention aims to provide a $CO_2$ recovery device and a $CO_2$ recovery method, which can solve the above problem.

Solution to Problem

In a first aspect of the present invention, a $CO_2$ recovery device includes an absorption tower configured to bring an emission gas including $CO_2$ in contact with an absorbent solution, to remove the $CO_2$ from the emission gas, and to thereby generate a rich solution corresponding to the absorbent solution having absorbed the $CO_2$; a regeneration tower configured to regenerate the absorbent solution by removing the $CO_2$ from the rich solution; a heat exchanger configured to carry out heat exchange between the rich solution and the absorbent solution which is higher in temperature than the rich solution and from which the $CO_2$ is removed; an absorbent-solution delivery pipe configured to deliver the absorbent solution subjected to the heat exchange in the heat exchanger to the absorption tower; and a bypass pipe configured to deliver the rich solution before the heat exchange, which will be introduced into the heat exchanger, to the absorbent-solution delivery pipe by controlling a bypass control valve.

The $CO_2$ recovery device may further include a first pressure measurement part configured to measure first pressure applied to the rich-solution delivery pipe configured to deliver the rich solution to the heat exchanger; and a bypass control part configured to increase the opening of the bypass control valve attached to the bypass pipe when the first pressure exceeds a predetermined threshold, thus delivering the rich solution before the heat exchange, which will be introduced into the heat exchanger, to the absorbent-solution delivery pipe.

The $CO_2$ recover device may further include a rich-solution delivery pipe configured to deliver the rich solution to the regeneration tower; a rich-solution control valve configured to adjust a flow rate of the rich solution, which is disposed adjacent to the regeneration tower rather than the heat exchanger configured to carry out the heat exchange between the rich solution flowing through the rich-solution delivery pipe and the absorbent solution; a liquid level measurement part configured to measure a liquid level of the absorbent solution accumulated in the base of the regeneration tower; and a liquid level control part configured to control the rich-solution control valve to increase its opening according to a reduction of the liquid level when a change rate of the liquid level shows an increasing trend but to control the bypass control valve to increase its opening according to a reduction of the liquid level when the change rate of the liquid level shows a decreasing trend.

In a second aspect of the present invention, a $CO_2$ recovery method for a $CO_2$ recovery device includes the steps of: bringing an emission gas including $CO_2$ in contact with an absorbent solution, removing the $CO_2$ from the emission gas, and thereby generating a rich solution in an absorption tower; regenerating the absorbent solution by removing the $CO_2$ from the rich solution in a regeneration tower; carrying out by a heat exchanger a heat exchange between the rich solution and the absorbent solution which is higher in temperature than the rich solution and from which the $CO_2$ is removed; delivering by an absorbent-solution delivery pipe the absorbent solution subjected to the heat exchange in the heat exchanger to the absorption tower; and delivering by a bypass pipe the rich solution before the heat exchange in the heat exchanger to the absorbent-solution delivery pipe by controlling a bypass control valve.

The $CO_2$ recovery method may further includes the steps of: measuring by a first pressure measurement part a first pressure applied to the absorbent-solution delivery pipe configured to deliver the rich solution before the heat exchange, which will be introduced into the heat exchanger; and increasing by a bypass control part the opening of the bypass control valve attached to the bypass pipe when the first pressure exceeds a predetermined threshold, thus delivering the rich solution before the heat exchange, which will be introduced into the heat exchanger, to the absorbent-solution delivery pipe.

The $CO_2$ recovery method may further includes the steps of: delivering by a rich-solution delivery pipe the rich solution to the regeneration tower; adjusting a flow rate of the rich solution using a rich-solution control valve, which is disposed adjacent to the regeneration tower rather than the heat exchanger configured to carry out the heat exchange between the absorbent solution and the rich solution flowing through the rich-solution delivery pipe; measuring by a liquid level measurement part the liquid level of the absorbent solution accumulated in the base of the regeneration tower; and controlling by a liquid level control part the rich-solution control valve to increase its opening according to a reduction of the liquid level when a change rate of the liquid level shows an increasing trend while controlling the bypass control valve to increase its opening according to a reduction of the liquid level when the change rate of the liquid level shows a decreasing trend.

Advantageous Effects of Invention

According to the present invention, it is possible to reduce a failure rate so that a $CO_2$ recover device can efficiently circulate an absorbent solution or a rich solution.

DESCRIPTION OF EMBODIMENTS

Hereinafter, a $CO_2$ recovery device according to one embodiment of the present invention will be described with reference to the drawings.

Figure 1:
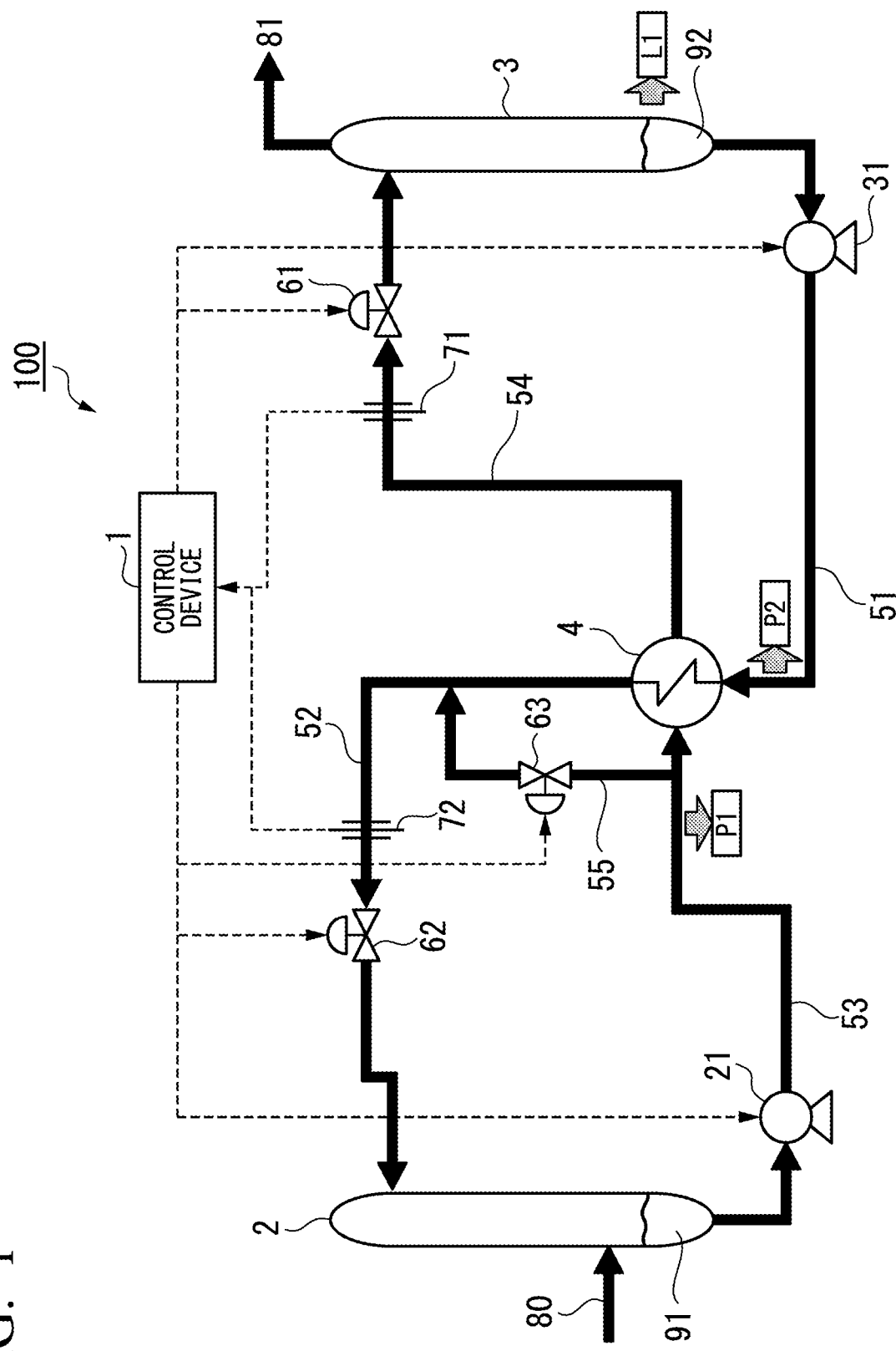
FIG. 1 is a schematic diagram of a $CO_2$ recovery device according to one embodiment of the present invention.

FIG. 1 is a schematic diagram of a $CO_2$ recovery device of the present embodiment.

As shown in FIG. 1, a $CO_2$ recovery device 100 mainly includes a control device 1, an absorption tower 2, a regeneration tower 3, and a heat exchanger 4.

Emission gas 80 emitted from industrial combustion facilities such as a boiler and a gas turbine will be sent to an emission-gas cooling device in which the emission gas 80 is cooled in cooling water and then sent to the absorption tower 2 of the $CO_2$ recovery device 100. In the absorption tower 2, the emission gas 80 communicates and contacts with an absorbent solution based on an amine-based solution such that $CO_2$ included in the emission gas 80 may be absorbed into the absorbent solution (a lean solution 92) in chemical reaction. An absorbent solution absorbing $CO_2$ will be referred to as a rich solution 91. The emission gas 80 after removal of $CO_2$ in the absorption tower 2 will be discharged to the outside. The rich solution 91 is pressurized by a rich-solution delivery pump 21 and then sent out to the heat exchanger 4 through a first rich-solution delivery pipe 53. In the heat exchanger 4, the rich solution 91 is heated by the lean solution 92 which is an absorbent solution regenerated by the regeneration tower 3 and which is higher in temperature than the rich solution 91, and then the heated rich solution 91 will be supplied to the regeneration tower 3 through a second rich-solution delivery pipe 54.

The rich solution 91 supplied to the regeneration tower 3 will be emitted from the upper section of the regeneration tower 3 into its inside. Inside the regeneration tower 3, the rich solution 91 may emit a majority of $CO_2$ due to an endothermic reaction. An absorbent solution having emitted part or majority of $CO_2$ in the regeneration tower 3 will be referred to as a semi-lean solution. When the semi-lean solution reaches the lower section of the regeneration tower 3, the semi-lean solution will be turned into the absorbent solution (i.e. the lean solution 92) from which roughly all of $CO_2$ has been removed. In the lower section of the regeneration tower 3, the absorbent solution is heated by a reboiler such that $CO_2$ included in the semi-lean solution may be emitted from the absorbent solution. Moisture is used as a heating source of a reboiler. The lean solution 92 will be sent to the heat exchanger 4 through a first absorbent-solution delivery pipe 51. A $CO_2$ gas 81 accompanied with moisture, which is emitted from the rich solution 91 and the semi-lean solution in the regeneration tower 3, is derived from the upper section of the regeneration tower 3. The moisture included in the emitted $CO_2$ gas 81 is condensed and sent back to the regeneration tower 3. In addition, the $CO_2$ gas 81 is emitted to the outside and then recovered separately. The recovered $CO_2$ gas 81 is pressed into an oil field using an enhanced oil recovery (EOR) or reserved in an aquifer, thus working out warming countermeasures. The lean solution 92, which is sent out to the heat exchanger 4 through the first absorbent-solution delivery pipe 51, is cooled by the rich solution 91 in the heat exchanger 4, and then the cooled lean solution 92 is supplied to the absorption tower 2 through a second absorbent-solution delivery pipe 52.

A rich-solution control valve 61 is attached to the second rich-solution delivery pipe 54. The control device 1 controls the rich-solution control valve 61 to control an amount of rich solution 91 delivered to the regeneration tower 3 in each unit time. The liquid level (or the level) of the lean solution 92 reserved in the lower section of the regeneration tower 3 may be fluctuated due to a varying amount of rich solution 91 delivered to the regeneration tower 3 in each unit time. A lean-solution control valve 62 is attached to the second absorbent-solution delivery pipe 52. The control device 1 controls the lean-solution control valve 62 to control an amount of lean solution 92 delivered to the absorption tower 2 in each unit time.

A rich-solution delivery pump 21 is attached to the first rich-solution delivery pipe 53. The control device 1 controls the rich-solution delivery pump 21 such that the rich solution 91 reserved in the lower section of the absorption tower 2 can be forcedly delivered to the heat exchanger 4 and the regeneration tower 3. A lean-solution delivery pump 31 is attached to the first absorbent-solution delivery pipe 51. The control device 1 controls the lean-solution delivery pump 31 such that the lean solution 92 reserved in the lower section of the regeneration tower 3 can be forcedly delivered to the heat exchanger 4 and the absorption tower 2.

According to the present embodiment, the $CO_2$ recovery device 100 provides a bypass pipe 55 connected between the first rich-solution delivery pipe 53 and the second absorbent-solution delivery pipe 52. A bypass control valve 63 is attached to the bypass pipe 55. The control device 1 controls the bypass control valve 63 to be opened such that the rich solution 91 prior to heat exchange, which will be applied to the heat exchanger 4, can be delivered to the second absorbent-solution delivery pipe 52.

The control device 1 may cause the rich solution 91 and the lean solution 92 to circulate in the $CO_2$ recovery device 100 by controlling the pressed delivery of the rich solution 91 via the rich-solution deliver pump 21, the pressed delivery of the lean solution 92 via the lean-solution delivery pump 31, the opening of the rich-solution control valve 61, and the opening of the lean-solution control valve 62. Specifically, the control device 1 acquires a flow rate per unit time which is obtained from a rich-solution flowmeter 71 and a lean-solution flowmeter 72, the liquid level of the lean solution 2 in the lower section of the regeneration tower 3, the liquid level of the rich solution 91 in the lower section of the absorption tower 2, and a load value (or an output value) of an industrial combustion facility such as a boiler and a gas turbine, and therefore the control device 1 may control the pressed delivery of the rich solution 91 via the rich-solution deliver pump 21, the pressed delivery of the lean solution 92 via the lean-solution delivery pump 31, the opening of the rich-solution control valve 61, and the opening of the lean-solution control valve 62 based on those pieces of information.

A level gauge L1 configured to detect the liquid level of the lean solution 92 is attached to the lower section of the regeneration tower 3. An excessive descending of the liquid level of the lean solution 92 in the lower section of the regeneration tower 3 may likely cause a failure such as cavitation due to an incapacity of the lean-solution delivery pump 31 to sufficiently deliver the lean solution 92. Therefore, it is required that the liquid level be set to a reference position. The control device 1 measures the liquid level of the lean solution 92 in the lower section of the regeneration tower 3 based on a measurement of the level gauge L1, and therefore the control device 1 carries out a feedback control for the opening of the rich-solution control valve 61 to thereby fix the liquid level. Specifically, the control device 1 decreases the opening of the rich-solution control valve 61 in preparation for a reduction of a flow rate of the rich solution 91 per unit time to be forcedly delivered from the absorption tower 2 via the rich-solution delivery pump 21 due to a reduction of load. This may increase the pressure of the first rich-solution delivery pipe 53. A pressure gauge P1 measures the pressure of the first rich-solution pipe 53 to output its measurement to the control device 1. A malfunction such as a failure of the heat exchanger 4 may occur when the heat exchanger 4 bears a load of pressure due to an increased pressure applied to the first rich-solution delivery pipe 53. For this reason, as described above, the $CO_2$ recovery device 100 of the present embodiment provides the bypass pipe 55, by which the rich-solution 91 is brought into the second absorbent-solution delivery pipe 52 when the control device 1 controls the bypass control valve 63 from CLOSE to OPEN. This may reduce the pressure of the first rich-solution delivery pipe 53, and therefore it is possible to allay a fear of causing a failure of the heat exchanger 4.

Figure 2:
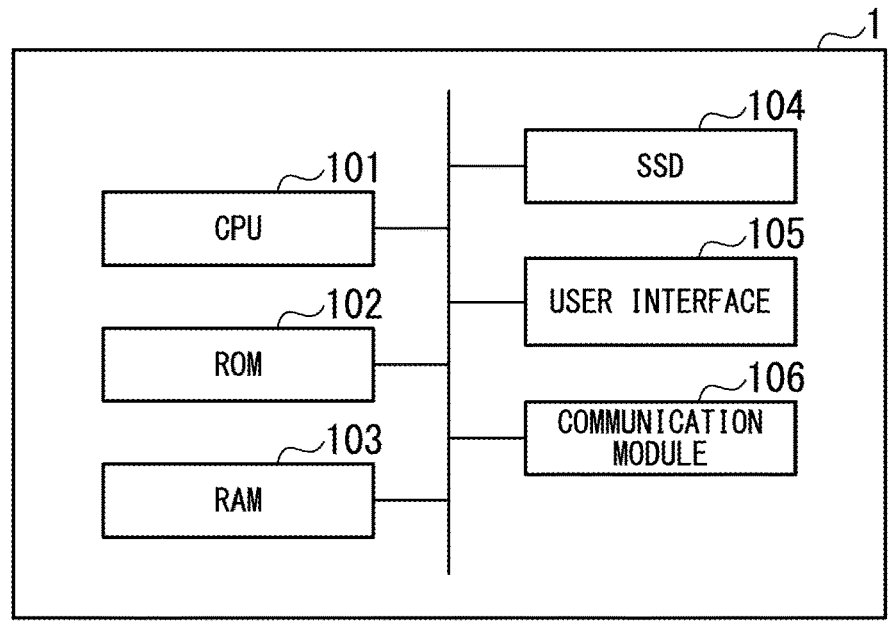
FIG. 2 is a block diagram showing a hardware configuration of a control device according to one embodiment of the present invention.

FIG. 2 is a block diagram showing the hardware configuration of the control device 1 of the present embodiment.

The control device 1 is a computer, as shown in FIG. 2, which includes various hardware elements such as a CPU 101, a ROM (Read-Only Memory) 102, a RAM (Random-Access Memory) 103, a storage unit such as a HDD (Hard-Disk Drive) 104, a user interface 105 such as a touch panel, and a communication module 106 to communicate with sensors.

Figure 3:
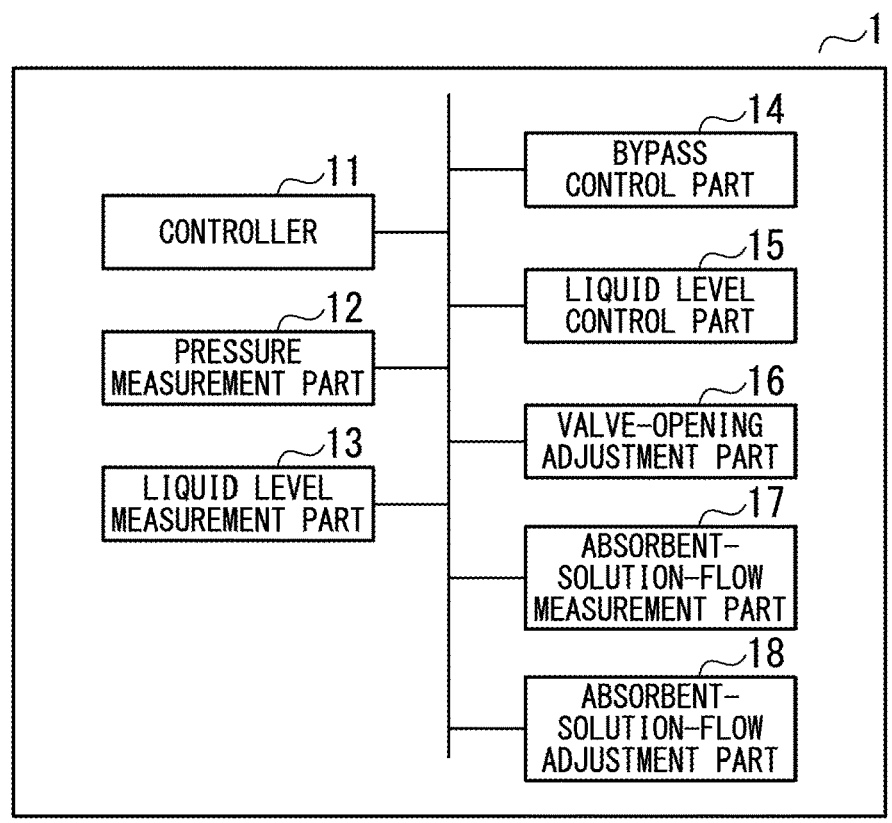
FIG. 3 is a functional block diagram of the control device according to one embodiment of the present invention.

FIG. 3 is a functional block diagram of the control device 1 of the present embodiment.

The CPU 101 of the control device 1 may execute preinstalled control programs after starting the operation of the control device 1. Thus, the control device 1 may realize a controller 11, a pressure measurement part 12, a liquid level measurement part 13, a bypass control part 14, a liquid level control part 15, a valve-opening adjustment part 16, an absorbent-solution-flow measurement part 17, and an absorbent-solution-flow adjustment part 18.

The controller 11 is configured to control various functional parts of the control device 1.

The pressure measurement part 12 is configured to measure the pressure of a predetermined pipe such as the pressure of the second rich-solution delivery pipe 54 configured to deliver the rich solution 91 to the heat exchanger 4.

The liquid-surface measurement part 13 is configured to measure the liquid level of the lean solution 92 accumulated in the base of the regeneration tower 3.

The absorbent-solution-flow measurement part 17 is configured to measure a flow rate per unit time given by the rich-solution flowmeter 71 and the lean-solution flowmeter 72.

The bypass control part 14 may instruct the valve-opening adjustment part 16 to increase the opening of the bypass control valve 63 when the pressure measured by the pressure measurement part 12 exceeds a predetermined threshold. As a result, the bypass control part 14 controls the rich solution 91 before heat exchange, which will be sent to the heat exchanger 4, to be delivered to the second absorbent-solution delivery pipe 52.

The liquid level control part 15 may instruct the absorbent-solution-flow adjustment part 18 to increase the opening of the rich-solution control valve 61 according to a reduction of the liquid level when the liquid level of the lean solution 92 accumulated in the bottom of the regeneration tower 4 is equal to or above a predetermine position. The liquid level control part 15 may instruct the absorbent-solution-flow adjustment part 18 to increase the opening of the bypass control valve 63 according to a reduction of the liquid level when the liquid level of the lean solution 92 accumulated in the base of the regeneration tower 3 is below a predetermined position.

The absorbent-solution-flow adjustment part 18 is configured to calculate the opening of the rich-solution control valve 61 and the opening of the lean-solution control valve 62 such that a flow rate measured by the absorbent-solution-flow measurement part 17 may reach a predetermined target value. The liquid level control part 15 may determine a target value for a rich-solution flow rate.

The valve-opening adjustment part 16 is configured to control the opening of the rich-solution control valve 61 and the opening of the bypass control valve 63 according to instructions from the bypass control part 14 and the absorbent-solution-flow adjustment part 18.

First Embodiment

Figure 4:
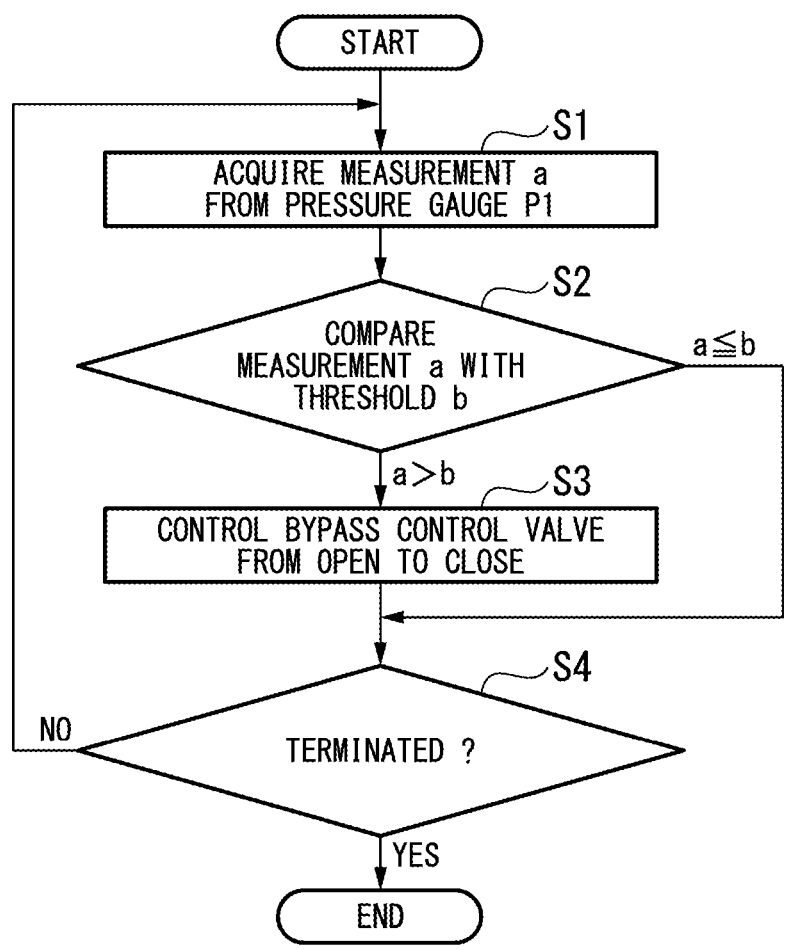
FIG. 4 is a first flowchart showing a processing flow of the control device according to one embodiment of the present invention.

FIG. 4 is a first flowchart showing a processing flow of the control device 1.

It is necessary to realize a fear that an excessive load may be imparted to the heat exchanger 4 due to an increasing pressure of the first rich-solution delivery pipe 53. The control device 1 is designed to reduce a load of pressure imparted to the heat exchanger 4 according to the following process.

First, the pressure measurement part 12 of the control device 1 acquires a measurement a from the pressure gauge P1 (step S1). The bypass controller 14 compares the measurement a with a threshold b of pressure (step S2). For example, the threshold b is produced by adding a predetermined value to pressure c of the first rich-solution delivery pipe 53 in its setting (b>c). The absorbent-solution-flow measurement part 17 measures a flow rate per unit time using the rich-solution flowmeter 71 and the lean-solution flowmeter 72, and therefore the absorbent-solution-flow adjustment part 18 acquires the measurement result. The absorbent-solution-flow adjustment part 18 controls the opening of the rich-solution control valve 61 and the opening of the lean-solution control valve 62 such that the flow rate per unit time, which is obtained from the rich-solution flowmeter 71 or the lean-solution flowmeter 72, may match a predetermined value. Herein, the opening control would be a circulation control for the rich solution 91 and the lean solution 92. It is assumed that the absorbent-solution-flow adjustment part 18 would instruct the valve-opening adjustment part 16 to decrease the opening of the rich-solution control valve 61. Accordingly, the valve-opening adjustment part 16 may decrease the opening of the rich-solution control valve 61 to the instructed opening. This may establish a relationship of "measurement a>threshold b" with respect to the pressure of the first rich-solution delivery pipe 53.

Upon determining through the above comparison that the measurement a exceeds the threshold b, the bypass control part 14 determines to carry out a bypass control. The bypass control part 14 instructs the valve-opening adjustment part 16 to change the bypass control valve 63 from OPEN to CLOSE (step S3). The bypass control part 14 may give an opening instruction to the valve-opening adjustment part 16 such that the opening of the bypass control valve 63 will be increased as the measurement a becomes a larger value; hence, the valve-opening adjustment part 16 may control the opening of the bypass control valve 63 according to the opening instruction. The bypass control part 14 determines to terminate the process (step S4), wherein the process will be resumed from step S1 unless the process is terminated.

According to the above process, it is possible for the control device 1 to reduce a load of pressure imparted to the heat exchanger 4 due to an increasing pressure applied to the first rich-solution delivery pipe 53. In addition, the control device 1 may constitute a minimum flowline using the bypass pipe 55, and therefore even when the rich-solution control valve 61 would be fully closed due to some reasons, it is possible to automatically circulate the rich solution 91 through the minimum flowline configured of the bypass pipe 55 adjacent to the absorption tower 2 by opening the bypass control valve 63.

In this connection, it is possible to attach a pressure gauge P2 to the first absorbent-solution delivery pipe 51 in the $CO_2$ recovery device 100, and therefore the control device 1 may control the rich solution 91 before heat exchange, which will be put into the heat exchanger 4, to be delivered to the second absorbent-solution delivery pipe 52 using the measurement a of the pressure gauge P1 as well as a measurement d of the pressure gauge P2.

Specifically, the bypass control part 14 obtains the measurement a from the pressure gauge P1 while obtaining the measurement d from the pressure gauge P2. Subsequently, when "measurement a>measurement d+α", the bypass control part 14 may instruct the valve-opening adjustment part 16 to change the bypass control valve 63 from CLOSE to OPEN.

Similar to the aforementioned effect, it is possible to reduce a load of pressure imparted to the heat exchanger 4 due to an increasing pressure applied to the first rich-solution delivery pipe 53.

Second Embodiment

Figure 5:
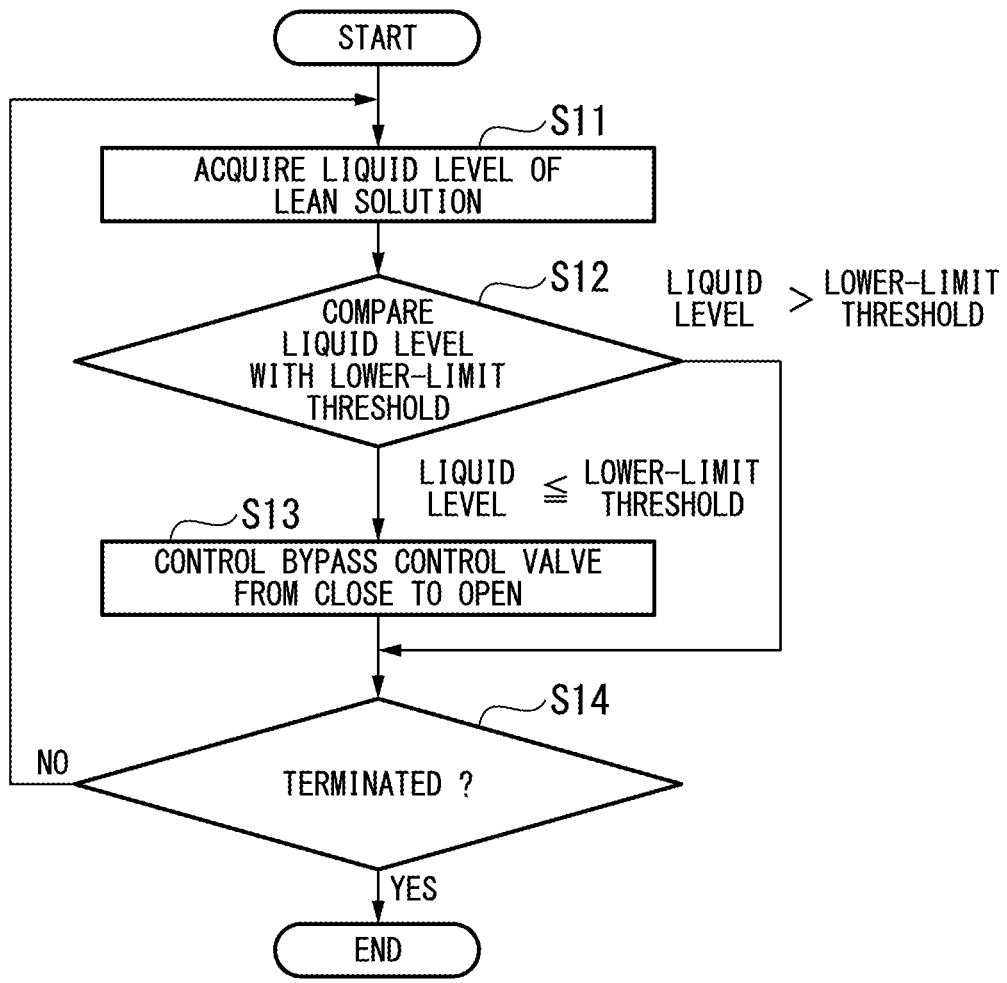
FIG. 5 a second flowchart showing a processing flow of the control device according to one embodiment of the present invention.

FIG. 5 is a second flowchart showing a processing flow of the control device 1.

In the $CO_2$ recovery device 100, it takes several minutes for the lean solution 92, corresponding to the rich solution 92 having removed $CO_2$ therefrom, to reach the lower section of the regeneration tower 3. For this reason, it is difficult to stabilize the liquid level of the lean solution 92 in the lower section of the regeneration tower 3. To solve this problem, the control device 1 of the $CO_2$ recover device 100 according to the second embodiment may control the rich solution 91 before heat exchange, which will be put into the heat exchanger 4, to be delivered to the second absorption-solution delivery pipe 52 using the bypass pipe 55.

Specifically, the liquid level control part 15 may acquire the liquid level of the lean solution 92 from the level gauge L1 configured to detect the liquid level of the lean solution 92 (step S11). The liquid level control part 15 is configured to control the liquid level of the lean solution 92 to be set to a predetermined reference value. The liquid level control part 15 compares the liquid level of the lean solution 92 with a lower-limit threshold which is below the predetermined reference value by a predetermined value or more (step S12). Upon determining that the liquid level of the lean solution 92 to be equal to or less than the lower-limit threshold, the liquid level control part 15 instructs an opening for the valve-opening adjustment part 16 to increase the opening of the bypass control valve 63. The valve-opening adjustment part 16 controls the bypass control valve 63 to be changed from CLOSE to OPEN (step S13). Accordingly, it is possible to deliver the rich solution 91 to the second absorbent-solution deliver pipe 52 through the bypass pipe 55 when the liquid level is significantly lowered. This makes the rich solution 92 flow into the second absorbent-solution delivery pipe 52 so as to decrease a flow rate per unit time for the lean solution 92 to flow from the first absorbent-solution deliver pipe 51 to the second absorbent-solution deliver pipe 52, thus decreasing an amount of emission per unit time for emitting the lean solution 92 from the lower section of the regeneration tower 3. Due to a good response in decreasing the amount of emission, it is possible to rapidly increase the liquid level of the lean solution 92. The liquid level control part 15 determined whether to terminate the process (step S14), wherein the process will be resumed from step S11 unless the process is terminated.

Figure 6:
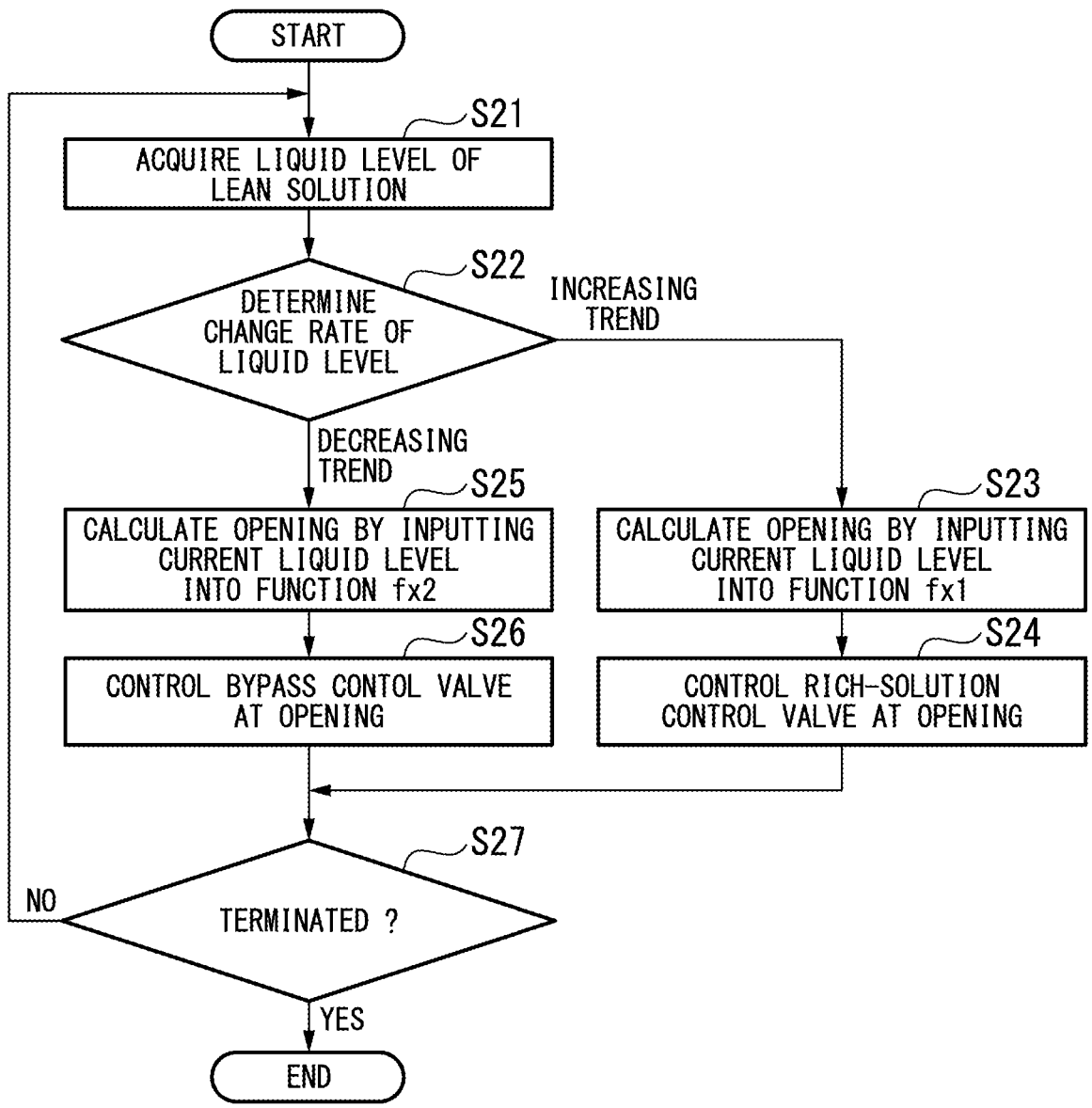
FIG. 6 is a third flowchart showing a processing flow of the control device according to one embodiment of the present invention.

FIG. 6 is a third flowchart showing a processing flow of the control device 1.

Figure 7:
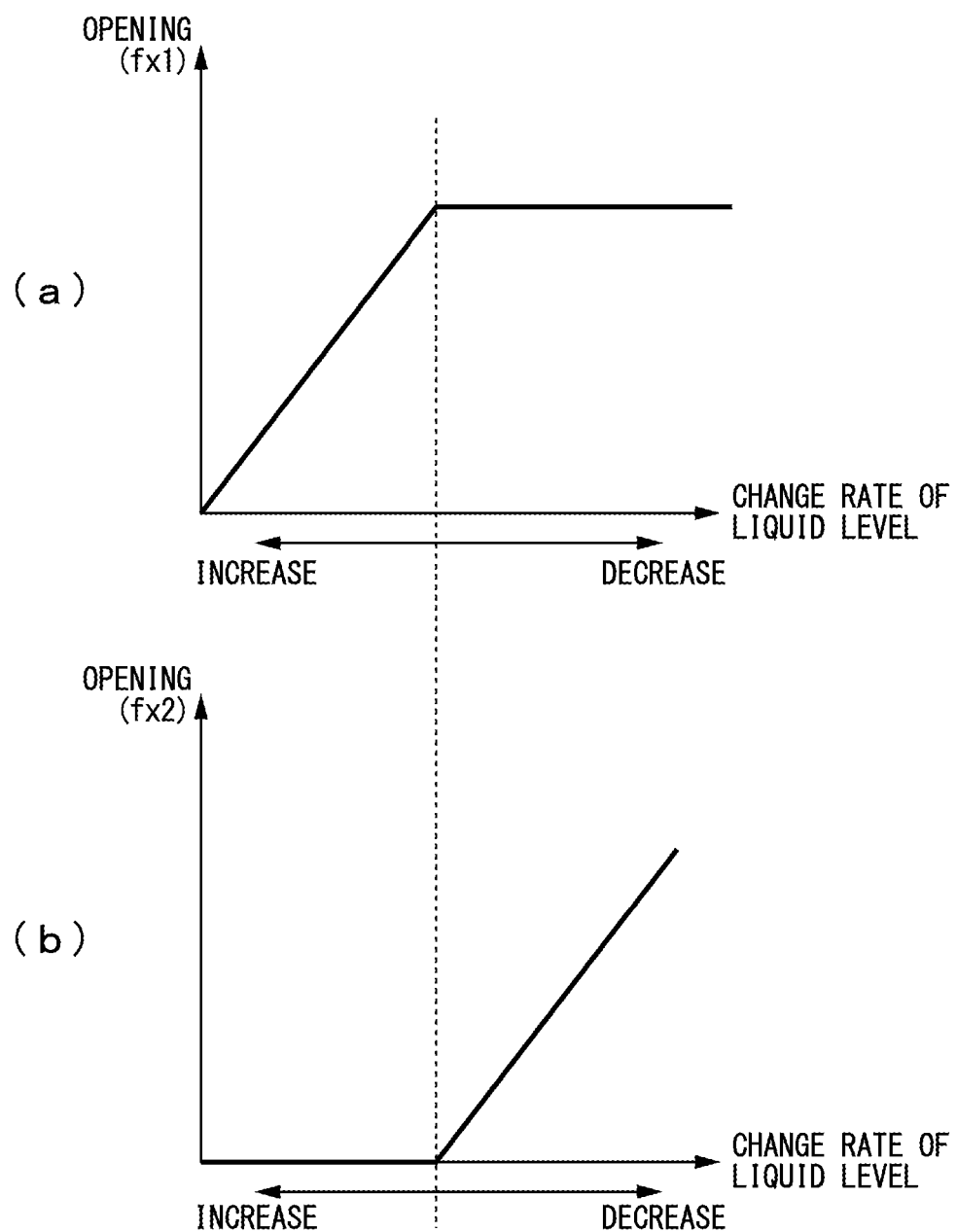
FIG. 7 includes graphs showing the relationship between openings and liquid levels according to a function fx1 and a function fx2.

FIG. 7 includes graphs showing the relationship between the openings and the liquid levels according to a function fx1 and a function fx2.

As described below, the control device 1 may carry out a control according to a change rate of the liquid level of the lean solution 92. Specifically, the liquid level control part 15 may acquire the liquid level of the lean solution 92 from the level gauge L1 configured to detect the liquid level of the lean solution 92 (step S21). The liquid level control part 15 is configured to control the liquid level of the lean solution 92 to be set to a predetermined reference value. The liquid level control part 15 determines a change rate of the liquid level of the lean solution 92 (step S22). When the change rate of the liquid level shows an increasing trend, the liquid level control part 15 may calculate an opening by inputting the current liquid level into the function fx1 (see a graph of FIG. 7(a)) for calculating the opening of the rich-solution control valve 61 to be decreased linearly as the increasing rate of the liquid level becomes large (step S23). The liquid level control part 15 instructs the valve-opening adjustment part 16 to make a control to achieve the calculated opening. The valve-opening adjustment part 16 controls the rich-solution control valve 61 to have the instructed opening (step S24). Accordingly, it is possible to reduce the liquid level of the lean solution 92 over time since a flow rate per unit time of the rich solution 91 to flow into the regeneration tower 3 may decrease as the increasing rate of the liquid level becomes large.

On the other hand, when the change rate of the liquid level shows a decreasing trend, the liquid level control part 15 may calculate an opening by inputting the current liquid level into the function fx2 (see a graph of FIG. 7(b)) for calculating the opening of the bypass control valve 63 to be linearly increased as the decreasing rate of the liquid level becomes large (step S25). The liquid level control part 15 instructs the valve-opening adjustment part 16 to make a control to achieve the calculated opening. The valve-opening adjustment part 16 controls the bypass control valve 63 to have the instructed opening (step S26). Accordingly, it is possible to deliver the rich solution 91 to the second absorbent-solution deliver pipe 52 through the bypass pipe 55 as the decreasing rate of the liquid level becomes large. This may decrease a flow rate per unit time of the lean solution 92 to flow from the first absorbent-solution deliver pipe 51 to the second absorbent-solution deliver pipe 52, thus decreasing an amount of emission per unit time for emitting the lean solution 92 from the lower section of the regeneration tower 3. Due to a good response in decreasing the amount of emission, it is possible to rapidly increase the liquid level of the lean solution 92. The liquid level control part 15 determines whether to terminate the process (step S27), wherein the process will be resumed from step S21 unless the process is terminated.

According to the aforementioned process of the control device 1, it is possible to make a control to stabilize the liquid level of the lean solution 92 in the lower section of the regeneration tower 3 in comparison with the conventional technology.

The aforementioned control device includes a computer system. The foregoing processes are stored in computer-readable storage media in the form of programs, wherein a computer may read and execute programs to achieve the foregoing processes. Herein, computer-readable storage media refer to magnetic disks, magneto-optical disks, CD-ROM, DVD-ROM, and semiconductor memory. In addition, computer programs may be delivered to computers through communication lines, and therefore a computer may receive and execute programs.

The foregoing programs may achieve part of the foregoing functions. In addition, the foregoing programs may be differential files (or differential programs) which can be combined with programs pre-installed in a computer system to achieve the foregoing functions.

REFERENCE SIGNS LIST

100 $CO_2$ recovery device
1 . . . control device
2 . . . absorption tower
3 . . . regeneration tower
4 . . . heat exchanger
11 . . . controller
12 . . . pressure measurement part
13 . . . liquid level measurement part
14 . . . bypass control part
15 . . . liquid level control part
16 . . . valve-opening adjustment part
51 . . . first absorbent-solution delivery pipe
52 . . . second absorbent-solution delivery pipe
53 . . . first rich-solution delivery pipe
54 . . . second rich-solution delivery pipe
61 . . . rich-solution control valve
62 . . . lean-solution control valve
63 . . . bypass control valve

The invention claimed is:

1. A $CO_2$ recovery device comprising:
an absorption tower configured to bring an emission gas including $CO_2$ in contact with an absorbent solution, to remove the $CO_2$ from the emission gas, and to thereby generate a rich solution corresponding to the absorbent solution having absorbed the $CO_2$;
a regeneration tower configured to regenerate the absorbent solution by removing the $CO_2$ from the rich solution;
a heat exchanger configured to carry out heat exchange between the rich solution and the absorbent solution which is higher in temperature than the rich solution and from which the $CO_2$ is removed;
an absorbent-solution delivery pipe configured to deliver the absorbent solution subjected to the heat exchange in the heat exchanger to the absorption tower;
a bypass pipe configured to deliver the rich solution before the heat exchange to the absorbent-solution delivery pipe; and
a control device configured to control a bypass control valve attached to the bypass pipe to increase its opening when a liquid level of the absorbent solution accumulated in a base of the regeneration tower is below a predetermined level.

2. The $CO_2$ recovery device according to claim 1, wherein when a first pressure applied to the rich-solution delivery pipe configured to deliver the rich solution to the heat exchanger exceeds a predetermined solution, the control device is configured to increase the opening of the bypass control valve attached to the bypass pipe and to thereby deliver the rich solution before the heat exchange to the absorbent-solution delivery pipe.

3. The $CO_2$ recover device according to claim 1, further comprising:
a rich-solution delivery pipe configured to deliver the rich solution to the regeneration tower; and
a rich-solution control valve configured to adjust a flow rate of the rich solution, which is disposed adjacent to the regeneration tower rather than the heat exchanger configured to carry out the heat exchange between the rich solution flowing through the rich-solution delivery pipe and the absorbent solution, wherein
the control device is configured to control the rich-solution control valve to increase its opening according to a reduction of the liquid level when the liquid level is above the predetermined level.

4. A $CO_2$ recovery method for a $CO_2$ recovery device, comprising:
bringing an emission gas including $CO_2$ in contact with an absorbent solution, removing the $CO_2$ from the emission gas, and thereby generating a rich solution in an absorption tower;
regenerating the absorbent solution by removing the $CO_2$ from the rich solution in a regeneration tower;
carrying out by a heat exchanger a heat exchange between the rich solution and the absorbent solution which is higher in temperature than the rich solution and from which the $CO_2$ is removed;
delivering by an absorbent-solution delivery pipe the absorbent solution subjected to the heat exchange in the heat exchanger to the absorption tower;
delivering the rich solution before the heat exchange to the absorbent-solution delivery pipe through a bypass pipe; and controlling a bypass control valve attached to the bypass valve to increase its opening when the liquid level of the absorbent solution accumulated in a base of the regeneration tower is below a predetermined level.

5. The $CO_2$ recovery method according to claim 4, further comprising:

when a first pressure applied to the absorbent-solution delivery pipe configured to deliver the rich solution before the heat exchange exceeds a predetermined threshold, increasing the opening of the bypass control valve attached to the bypass pipe when the first pressure exceeds a predetermined threshold, thus delivering the rich solution before the heat exchange to the absorbent-solution delivery pipe.

6. The $CO_2$ recovery method according to claim 4, further comprising:

delivering by a rich-solution delivery pipe the rich solution to the regeneration tower;

adjusting a flow rate of the rich solution using a rich-solution control valve, which is disposed adjacent to the regeneration tower rather than the heat exchanger configured to carry out the heat exchange between the absorbent solution and the rich solution flowing through the rich-solution delivery pipe; and controlling the rich-solution control valve to increase its opening according to a reduction of the liquid level when the liquid level is above the predetermined level.

* * * * *